United States Patent [19]

Ogawa et al.

[11] 4,254,148
[45] Mar. 3, 1981

[54] COLDPROOF CHEWING GUM

[75] Inventors: Koichi Ogawa, Tokyo; Shichigoro Tezuka, Kawasaki; Takashi Maruyama, Hino; Kazuo Kiyokawa, Higashimurayama, all of Japan

[73] Assignee: Lotte Co., Ltd., Tokyo, Japan

[21] Appl. No.: 61,461

[22] Filed: Jul. 27, 1979

[30] Foreign Application Priority Data

Oct. 31, 1978 [JP] Japan ................................ 53-133200

[51] Int. Cl.³ ............................................. A23G 3/30
[52] U.S. Cl. ......................................... 426/3; 426/6; 426/565; 426/101
[58] Field of Search ........................................ 426/3-6, 426/565, 101

[56] References Cited

U.S. PATENT DOCUMENTS

| 3,262,784 | 7/1966 | Bucher | 426/5 |
| 3,974,293 | 8/1976 | Witzel | 426/4 |
| 3,984,574 | 10/1976 | Comollo | 426/4 |

Primary Examiner—Jeanette M. Hunter

[57] ABSTRACT

A gum base for the coldproof chewing gum comprises 0 to 15% of natural resin, 10 to 20% of vinyl acetate resin, 6 to 16% of ester gum, 12 to 25% of rubber, 12 to 20% of wax, 14 to 20% of emulsifier and 10 to 20% of filler. The coldproof chewing gum may be combined with a frozen dessert such as an ice cream. A coldproof bubble chewing gum is also disclosed.

5 Claims, 1 Drawing Figure

COLDPROOF CHEWING GUM

BACKGROUND OF THE INVENTION

This invention relates to an improvement in a chewing gum, and more particularly to a coldproof chewing gum suitable for chewing in a cold weather such as the winter season in a cold area and to a combination of the coldproof chewing gum with an ice cream.

In general, a chewing gum has a trend of hardening even in a mild winter season, and therefore when the chewing gum is chewed in the winter season it must be soften in a mouth to a certain degree before chewing or be chewed little by little from an edge thereof in order to facilitate softening. This hardening phenomenon has been encountered in the winter season in everywhere in the world and has usually reduced the demand for the chewing gum in the cold season. Thus, the chewing gum is generally desired which has little or no trend of hardening in the cold weather and is very soft in chewing.

For obtaining such type of chewing gum, one method is to prepare the chewing gum by use of soft materials only, excluding hard types of natural resins. This method, however, makes a texture of chewing gum extremely soft and could cause a softening and melting phenomenon. Further, the method has a disadvantage of not providing a desired elasticity for the chewing gum.

The inventors have discovered that the hardening phenomenon of the chewing gum in the cold environment has been caused mainly due to raw materials for the chewing gum and a compounding ratio of the same. Namely, they have found out as a result of determining the hardness of various chewing gum materials after having placed the same under the temperature of approximately −10° C. for 24 hours, that a vinyl acetate resin, a natural resin and an ester gum have trends of extremely hardening while natural or synthetic rubbers (for example, polybutene, polyisobutylene, isobutylene-isoprene rubbers) does not substantially harden, and that fillers such as calcium carbonate, talc and the like, waxes and emulsifiers such as monoglycerides have little or no effect on hardening at the temperature between 36° and −10° C., as shown in FIG. 1.

Based on the foregoing knowledge, the inventors have further found out upon preparation of the chewing gum base that a decrease in an amount of natural resin, vinyl acetate resin and/or ester gum with an increase of natural and/or synthetic rubbers and with a substantial increase of emulsifier in the gum base makes the chewing gum soft in chewing and appropriately elastic even in the low temperature of −10° C. The chewing gum obtained has softness in chewing and does not cause the softening and melting phenomenon while maintaining suitable elasticity after having been chewed for more than 5 minutes. Thus, the chewing gum may be referred to as "a coldproof chewing gum".

Since this coldproof chewing gum has a low temperature-resistant property as described hereinbefore, a combination thereof with an ice cream yields a novel frozen dessert. Since the coldproof chewing gum maintains its ample elasticity and does not harden even when the combination is placed in a freezing temperature of about −20° to −30° C. which is desired for keeping the ice cream frozen, a person who eats the frozen dessert can enjoy both the ice cream and the remaining chewing gum.

SUMMARY OF THE INVENTION

A general object of the invention is to provide a coldproof chewing gum which does not harden and maintains its appropriate elasticity and its softness even in the cold condition.

A principal object of the invention is to provide a chewing gum base comprising a 0 to 15 wt. % of a natural resin, 10 to 20 wt. % of a vinyl acetate resin, 6 to 16 wt. % of an ester gum, 12 to 25 wt. % of a rubber, 12 to 20 wt. % of a wax, 14 to 20 wt. % of an emulsifier and 10 to 20 wt. % of a filler based on the weight of the chewing gum base.

Another object of the invention is to provide a coldproof chewing gum which contains the chewing gum base comprising 5 to 15 wt. % of a natural resin, 10 to 13 wt. % of a vinyl acetate resin, 6 to 8 wt. % of an ester gum, 15 to 25 wt. % of a rubber, 12 to 20 wt. % of a wax, 15 to 20 wt. % of an emulsifier and 15 to 20 wt. % of a filler, and conventional chewing gum additives comprising sugars, flavors and others.

In the chewing gum base according to the invention replacement of the natural resin with the vinyl acetate resin and the ester gum provides a bubble chewing gum base suitable for preparation of a coldproof bubble chewing gum. Thus, addition of conventional chewing gum additives to the bubble gum base yields the coldproof bubble chewing gum.

Accordingly, still another object of the invention is to provide a bubble chewing gum base comprising 15 to 20 wt. % of a vinyl acetate resin, 11 to 16 wt. % of an ester gum, 12 to 20 wt. % of a rubber, 13 to 20 wt. % of a wax, 14 to 18 wt. % of an emulsifier and 10 to 15 wt. % of a filler based on the weight of the bubble chewing gum base.

A still another object of the invention is to provide a coldproof bubble chewing gum which contains the bubble chewing gum base comprising 15 to 20 wt. % of a vinyl acetate resin, 11 to 16 wt. % of an ester gum, 12 to 20 wt. % of a rubber, 13 to 20 wt. % of a wax, 14 to 18 wt. % of an emulsifier and 10 to 15 wt. % of a filler, and conventional chewing gum additives comprising sugars, flavors, softening agents and others.

These and many other objects and advantages of the invention will be readily apparent from the following description.

DESCRIPTION OF THE INVENTION

Figure 1:
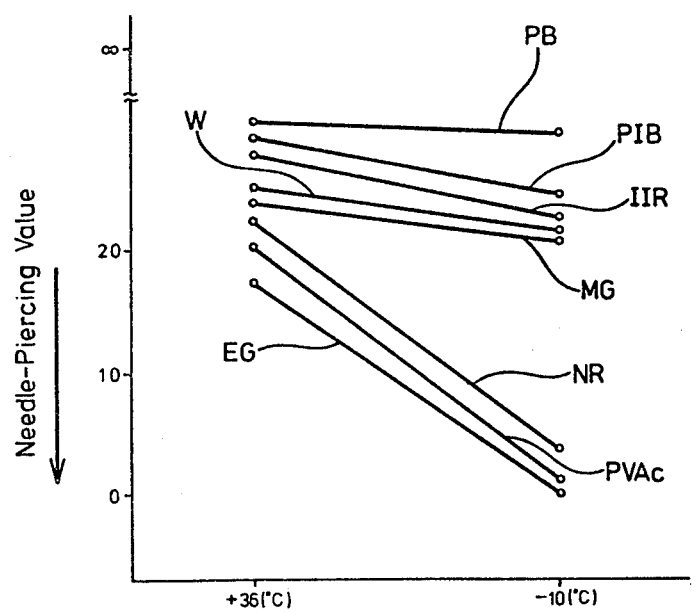
FIG. 1 is a diagram showing the hardening extents of the several materials for chewing gum base in the temperature, with symbols PB being polybutene, PIB polyisobutylene, IIR isobutylene-isoprene rubber, W wax, MG monoglyceride, NR natural resin, PVAc vinyl acetate resin and EG ester gum.

The materials for use in the chewing gum base (for example, the gum base for plate chewing gum) and the bubble chewing gum base according to the invention, namely natural resins, vinyl acetate resins, ester gums, waxes, emulsifiers, and fillers are well-known in the art and the additives for the coldproof chewing gum and the bubble chewing gum are also well-known.

In order to prevent the hardening and keep the ample elasticity in the cold, addition of substantially larger proportions of the natural and/or synthetic rubbers and usage of extremely larger amount of the emulsifier as compared with the conventional chewing gum are particularly important in the invention. The possible synthetic rubbers include general synthetic rubbers such as polybutene, polyisobutylene, isobutyleneisoprene rubber, styrene-butadien rubber and the like. As the emulsifier the usage of monoglycerides is preferred.

Most essential feature of the invention is to select a compounding ratio of the well-known gum base materials as described hereinbefore. The amounts of natural and/or synthetic rubbers and emulsifiers used are especially important. The compounding ratio of the materials is, therefore, described in detail hereinbelow.

The natural resin is very sensitive to hardening in the cold temperature. Accordingly, the natural resin is not added to the bubble chewing gum base which does not particularly need the same, while for the coldproof chewing gum in the form of a plate type gum for example about 5 to 15%, preferably 8 to 12% by weight of the natural resin is essential to provide an appropriate elasticity.

The vinyl acetate resin and the ester gum are especially sensitive to hardening in the low temperature and therefore should be limited to the necessary minimum range. For the coldproof chewing gum 10 to 20%, preferably 10 to 13% by weight of the vinyl acetate resin and 6 to 16%, preferably 6 to 8% by weight of the ester gum may be used. For the bubble chewing gum these materials are correspondingly increased as the substitutes for the natural resin and there may be used 15 to 20%, preferably 15 to 17% by weight of the vinyl acetate resin, and 11 to 16% by weight of the ester gum.

An amount of the wax used is of same level as that of the conventional chewing gum and is in the range of 12 to 20% by weight.

The emulsifier is a very important component in the invention, and it has not been clearly understood what mechanism could prevent the hardening of the chewing gum in the cold, although the considerably increased amount in the range of 14 to 20% by weight has an outstanding effect on the chewing gum of the invention, while the conventional chewing gum contains the same in an amount of 1 to 3% by weight (8 to 11% by weight for the bubble chewing gum).

The filler such as calcium carbonate may be used in an amount of 10 to 20% by weight for both the chewing gum base and the bubble gum base of the invention, but desirably the amount for the bubble gum is reduced to some extent and is in the range of 10 to 15% by weight, while the amount of 15 to 20% by weight for the chewing gum base being preferred.

Lastly, the rubber content, which is most important in the chewing gum of the invention is in the range of 12 to 25, preferably 15 to 25% by weight, depending on the type and nature of the rubber, if for example the soft type rubber is used.

The foregoing amounts of materials may be kneaded by means of the conventional kneading apparatus such as a kneader to obtain the chewing gum base or the bubble gum base according to the invention.

To the resulting gum base is added the conventional chewing gum additives (such as sugars, flavors and others) and if desired the softening agents (such as liquid sorbitol, glycerine and the like) and the mass are kneaded to prepare the coldproof chewing gum or bubble gum according to the invention.

The coldproof chewing gum or bubble chewing gum of the invention in any shape of for example plates, chips or marbles may be combined with an ice cream to produce a novel frozen dessert. The combination with the ice cream may be of any type such as a sandwich of the any type of ice cream with the coldproof chewing gum or a dispersion of chip type of the coldproof chewing gum in the ice cream.

The coldproof chewing gum according to the invention does not extremely harden and provides a softness in chewing and a good feeling with an adequate elasticity even in the cold temperature of $-10°$ C. or under the freezing condition of ice cream of 31 20° to $-30°$ C.

The examples of the coldproof chewing gum and the combination thereof with the ice cream according to the invention are illustrated hereinbelow, comparing with the conventional chewing gum.

EXAMPLE 1

(Comparison of compositions of gum bases for plate type chewing gums)

The composition of the gum base for the plate type chewing gum according to the invention is compared with that of the conventional chewing gum base, as shown in the following.

|  | Conventional Gum Base | Gum Base of The Invention |
|---|---|---|
| Natural Resins | 20–35 wt. % | 5–15 wt. % |
| Vinyl Acetate Resins | 13–17 | 10–13 |
| Ester Gums | 8–11 | 6–8 |
| Rubbers | 5–12 | 15–25 |
| Waxes | 18–25 | 12–20 |
| Emulsifiers | 1–3 | 15–20 |
| Fillers | 10–13 | 15–20 |

To the above gum bases were added the usual amount of sugars to prepare the chewing gums. In these cases, liquid sorbitol and glycerine were used as the softening agents.

ORGANOLEPTIC AND PHYSICAL TESTS

The coldproof chewing gum and the conventional plate type chewing gum prepared in the foregoing were tested organoleptically and physically, the results of which are shown in Tables 1 and 2. In these tests, samples were used after having been placed in the temperature of $-10°$ C. for 3 days.

Organoleptic Aspect

The two types of chewing gum hereinabove described were chewed by a panel of 10 persons, which gave the following results.

TABLE 1

|  | Hardness in Chewing | Feeling | Taste | Overall Evaluation |
|---|---|---|---|---|
| Conventional Chewing Gum | 0 | 0 | 6 | 0 |
| Chewing Gum of The Invention | 10 | 10 | 4 | 10 |

The value shows the number of persons who gave a good mark for one chewing gum of the two.

Physical Aspect

In order to measure the hardness in chewing, each five samples of the two types of chewing gums were tested in the temperature of $-10°$ C. by use of a needlepiercing meter, the result of which is shown in the following table.

TABLE 2

|  | 1 | 2 | 3 | 4 | 5 | Average |
|---|---|---|---|---|---|---|
| Conventional Chewing Gum | 4 | 3 | 8 | 3 | 6 | 4.8 |
| Chewing Gum of The Invention | 16 | 18 | 16 | 20 | 17 | 17.4 |

The higher value shows the greater softness.

As shown in the above tables, the coldproof chewing gum of the invention is excellent in both the organoleptic and physical aspects in the low temperature of $-10°$ C., compared with the conventional chewing gum.

EXAMPLE 2

(Comparison of compositions of gum bases for bubble chewing gums)

The composition of the gum base for the bubble chewing gum according to the invention is compared with that of the conventional one, as shown in the followings.

|  | Conventional Gum Base | Gum Base of The Invention |
|---|---|---|
| Vinyl Acetate Resins | 25-30 wt. % | 15-20 wt. % |
| Ester Gums | 15-20 | 11-16 |
| Rubbers | 5-10 | 12-20 |
| Waxes | 12-18 | 13-20 |
| Emulsifiers | 8-11 | 14-18 |
| Fillers | 10-15 | 10-15 |

EXAMPLE 3

(Combination with ice cream)

Thus-obtained coldproof chewing gum was coated with sugars and then with shellac in the following proportions of the respective ingredients to prepare the water- and cold-resistant chewing gum.

| Ingredients | Parts by weight |
|---|---|
| Cold-resistent Chewing Gum | 35 |
| Center Syrup (Brix 70) | 8 |
| Powder Sugar | 5 |
| Finishing Syrup (Brix 60) | 1 |
| Shellac Resin | 0.03 |
| Total | 49.03 |

The resulting water- and cold-resistant chewing gum was put into the ice cream, and the combination was stored in the usual freezing temperature for the ice cream of $-20°$ to $-30°$ C. for about 6 months and then removed for eating. Nevertheless, the chewing gum maintained the softness in chewing and the good feeling.

Accordingly, it will be appreciated that the coldproof chewing gum of the invention has the stability even after having been put into the ice cream and stored in the freezing state over about 6 months.

What is claimed is:

1. A chewing gum base comprising 0 to 15 wt. % of a natural resin, 10 to 20 wt. % of a vinyl acetate resin, 6 to 16 wt. % of an ester gum, 12 to 25 wt. % of a rubber, 12 to 20 wt. % of a wax, 14 to 20 wt. % of an emulsifier and 10 to 20 wt. % of a filler based on the weight of the chewing gum base.

2. A coldproof chewing gum which contains a chewing gum base comprising 5 to 15 wt. % of a natural resin, 10 to 13 wt. % of a vinyl acetate resin, 6 to 8 wt. % of an ester gum, 15 to 25 wt. % of a rubber, 12 to 20 wt. % of a wax, 15 to 20 wt. % of an emulsifier and 15 to 20 wt. % of a filler, and conventional chewing gum additives including sugars, flavors and others.

3. A bubble chewing gum base comprising 15 to 20 wt. % of a vinyl acetate resin, 11 to 16 wt. % of an ester gum, 12 to 20 wt. % of a rubber, 13 to 20 wt. % of a wax, 14 to 18 wt. % of an emulsifier and 10 to 15 wt. % of a filler based on the weight of the bubble chewing gum base.

4. A coldproof bubble chewing gum which contains a bubble chewing gum base comprising 15 to 20 wt. % of a vinyl acetate resin, 11 to 16 wt. % of an ester gum, 12 to 20 wt. % of a rubber, 13 to 20 wt. % of a wax, 14 to 18 wt. % of an emulsifier and 10 to 15 wt. % of a filler, and conventional chewing gum additives comprising sugars, flavors, softening agents and others.

5. A frozen dessert comprising particles of the chewing gum base of claim 1 in combination with ice cream.

* * * * *